United States Patent [19]  [11] 3,767,443
Clark et al.  [45] Oct. 23, 1973

[54] PIGMENTS

[75] Inventors: David William Harold Clark, Leigh-on-Sea; Terence Leslie Threlfall, London, both of England

[73] Assignee: May & Baker Limited, Essex, England

[22] Filed: Oct. 18, 1971

[21] Appl. No.: 190,406

Related U.S. Application Data

[62] Division of Ser. No. 758,056, Sept. 6, 1968, Pat. No. 3,627,553.

[30] Foreign Application Priority Data
Sept. 8, 1967 Great Britain ................... 41,182/67

[52] U.S. Cl. ............................................. 106/291
[51] Int. Cl. ..................................................... C09c
[58] Field of Search ............... 106/291, 308 Q, 299, 106/300; 117/100 B, 72, 73

[56] References Cited
UNITED STATES PATENTS

| 3,071,482 | 1/1963 | Miller | 106/291 X |
| 3,123,490 | 3/1964 | Bolomey et al. | 106/291 |
| 3,138,475 | 6/1964 | Schröder | 106/291 |
| 3,514,403 | 5/1970 | Muendel | 106/299 X |
| 3,123,489 | 3/1964 | Bolomey et al. | 106/291 |
| 3,198,647 | 8/1965 | Kress | 106/308 Q |
| 3,224,993 | 12/1965 | Wynne | 106/300 X |

Primary Examiner—Helen M. S. Sneed
Attorney—Stevens et al.

[57] ABSTRACT

The invention provides novel nacreous pigments comprising a plurality of high refractive index layers of titanium or zirconium dioxide or of an alkaline earth metal titanate separated by one or more layers of lower refractive index of an organic film-forming substance or of an inorganic oxide or hydroxide. These pigments are made by successively depositing the various layers on a support, stripping the product from the support and comminuting it.

20 Claims, 2 Drawing Figures

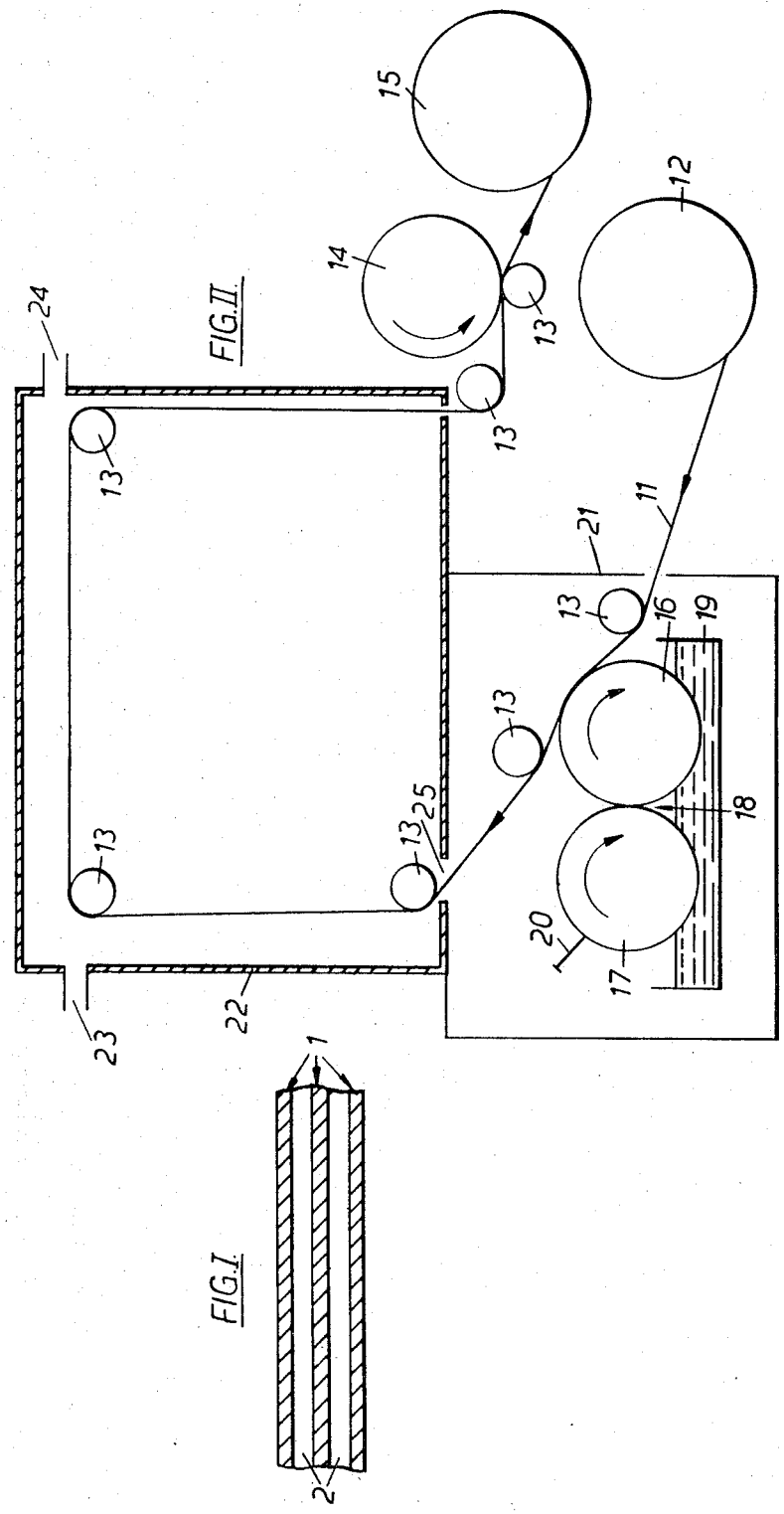

PIGMENTS

This application is a Divisional from U.S. Ser. No. 758,056 filed Sept. 6, 1968 now U.S. Pat. No. 3,627,553.

This invention relates to pigments of a nacreous or decorative character and their production.

One of the most satisfactory nacreous pigments (or pearling agents) is natural pearl essence, the naturally occurring form of guanine which can be obtained from fish scales. Unfortuantely, however, this substance is difficult to isolate and thus very costly. Moreover, attempts to make a similar form of guanine synthetically have so far failed. Artificial nacreous pigments have in general suffered from one or other of the defects of being insufficiently pearlescent or too toxic for general use. Ideally, a nacreous pigment should not only be inherently pearlescent but, in addition, have a high refractive index, good stability to heat and light, chemical unreactivity, and lack of toxicity. Titanium dioxide satisfies these criteria, and a number of proposals have therefore been made for producing nacreous pigements from this substance.

Known titanium dioxide pigments, produced by hydrolysis of titanium esters, have suffered from a number of disadvantages. They have been costly to produce, have had poor nacreous lustre or colour, or have been unstable to light, or have had a combination of these defects. It has been proposed to improve the quality of the product by increasing the reflectance of the particles. This can be achieved by making a multi-layer product consisting of layers of a high refractive index material such as titanium dioxide, alternately with a low refractive index material such as calcium fluoride. Methods devised for making such pigments have usually had recourse to deposition of layer material from the vapour phase at low pressures. These procedures are inherently expensive to operate.

The present invention provides new pigments based on titanium dioxide or the chemically closely related zirconium dioxide or alkaline earth metal titanates which have a decorative or highly pearlescent appearance approaching natural pearl essence in quality, and which in certain preferred embodiments can be made chemically very inert and resistant to heat and light, and also to display different colours.

The pigment of the present invention comprises a plurality of thin, clear layers of titanium or zirconium dioxide, or an alkaline earth metal titanate (these layers are referred to hereinafter as the high refractive index layers) separated by, and adherent to, one or more thin, clear layes of an interleaving agent, which is either (a) an organic film-forming substance containing hydroxyl groups, carboxylic anhydride or carboxylic ester groups, or other groups, capable of reacting with titanium ester zirconium ester or alkaline earth metal titanic ester groups or (b) an inorganic oxide or hydroxide layer generally formed by hydrolysis of a suitable compound to an oxide or hydroxide, the refractive index of the high refractive index layer exceeding that of the interleaving agent layer by at least 0.05. The refractive index of the titanium dioxide is preferably 1.85 to 1.95 and that of the zirconium dioxide and the alkaline earth metal titanates 1.69 to 1.75, but when the interleaving agent is an oxide or hydroxide (b), the refractive index of the former materials may be raised by heating the pigment as hereinafter described. The refractive index of th interleaving agent is usually 1.45 to 1.57 but may be as high as 1.8, particularly when the interleaving agent is an oxide or hydroxide (b) and the pigment is heated, provided always that it is lower than that of the titanium or zirconium dioxide or alkaline earth metal titanate layer by at least 0.05. Preferably, the difference in refractive index between the titanium or zirconium dioxide or alkaline earth metal titanate and the interleaving agent is greater than 0.05 and is 0.2 to 0.5. By suitable choice of layer thicknesses, a hereinafter described, a range of coloured pigments can be produced. These materials owe their colour to optical interference of light to produce the coloured effect rather than to absorption phenomena. The preferred materials for the interleaving agents, because they are colourless and non-toxic, are the oxides and hydroxides of aluminum, silicon, magnesium-/aluminium, calcium/aluminium, strontium/aluminium, sodium/tin, magnesium, calcium, aluminium/titanium or lithium/titanium, and mixtures of these oxides and hydroxides, derived from corresponding esters or alkoxides. However, any hydrolysable compound of a metal or metalloid capable of yielding on hydrolysis an oxide or hydroxide as a clear adherent film can be employed. The terms "alkoxide" and "ester" are used interchangeably herein as it is, in many cases, difficult to determine whether a given compound is mainly ionic or mainly covalent. It is to be understood that the terms "titanium dioxide" and "zirconium dioxide" are used herein to refer to the hydrolysis products of titanic and zirconic esters respectively, although such hydrolysis products are not necessarily pure dioxide, and will generally contain residual unhydrolysed ester groupings, and some hydroxyl groups. Simiarly the terms "alkaline earth metal titanate" refers to the hydrolysis product of an alkaline aerth metal, e.g. calcium, titanic ester and does not imply that the material is necessarily a pure alkaline earth metal titanate.

In accordance with this invention, the new pigment is made by applying alternately to a support thin layers of (I) a hydrolysable titanic or zirconic ester or alkaline earth metal titanic ester, and (II) as interleaving agent former, either (a) an organic film-forming substance containing hydroxyl, carboxylic anhydride, carboxylic ester, or other groups capable of reacting with titanium ester, zirconium ester or alkaline earth metal titanic ester groups, or (b) a compound capable of being hydrolysed to a clear, adherent layer of an inorganic oxide or hydroxide, preferably an aluminium, silicon, magnesium/aluminium, calcium/aluminium, strontium-/aluminium, magnesium, calcium, sodium/tin, aluminium/titanium, or lithium/titanium compound hydrolysable to the corresponding oxide or hydroxide, or a mixture of such compounds hydrolysable to a mixture of the corresponding oxides or hydroxides; hydrolysing each hydrolysable layer immediately after application by contact with water vapour; and when at least two layers of the titanic or zirconic ester or alkaline earth metal titanic ester have been applied and hydrolysed, stripping the multi-layer product from the support. In order to obtain the best results, it is desirable that the surface of the support should be as smooth and uniform as possible.

To obtain continuous production of the pigment, the support is preferably an inert, long or endless (i.e. looped) belt. Suitable materials for the belt are metals, plastics and coated paper, and the material must, of course, be inert to water and the various reagents used.

Not all potentially suitable belt materials will in fact allow satisfactory clear films to be laid down under equivalent conditions; for example, with polytetrafluoroethylene or cellulose acetate sheet, cloudy films are readily formed, from which only poor quality pearly material can be made. This may be the result of an absorbed layer of moisture on the sheet, or of poor heat capacity or heat conductivity. It is, however, very easy to select a suitable material by simple small-scale trial. Polyethylene terephthalate film, which is readily available, has been found to be very suitable.

So that the pigment can readily be stripped from the support, it is desirable to provide the latter with a release layer to prevent the pigment from adhering to the support. It is convenient for such a layer to be soluble in water so that immersion in water of the film carrying the pigment on the release layer causes the pigment to separate from the film. Since layers of titanium dioxide formed by hydrolysis of the esters tend to darken on keeping, a further important function of the release layer is to stabilise the pigment, possibly through chemical binding of a monolayer of release agent on the fresh titanium dioxide surface. Another fuction of the release layer, which probably depends on the same monolayer, is in acting as a mild surfactant which discourages coagulation of the multi-layer pigments during isolation. An especially suitable material for the release layer is polyethylene glycol in the molecular weight range 6,000 to 100,000, which may be applied in solution in methanol, but other water-soluble substances may be used.

The hydrolysable titanic or zirconic ester is generally a tetra-alkyl titanate or zirconate in which each alkyl group contains one to eight carbon atoms. Titanium compounds are preferred because of their ready availability and lower cost. Tetra-isopropyl titanate and tetra-n-butyl titanate are both available commercially and are preferably used in the present invention. Tetra-isopropyl titanate which hydrolyses readily to give layers of refractive index 1.85–1.95 depending on plating conditions, produces pearling agents which have superior reflectivity to those from tetra-n-butyl titanate. The latter ester, however, is easier to use because it hydrolyses less readily. The hydrolysable alkaline earth metal titanic ester is preferably calcium titanium isopropoxide, although other esters can be used, e.g. esters in which each alkyl group contains one to eight carbon atoms. This ester, as well as tetra-n-propyl zirconate and tetra-n-butyl titanate, produces film of refractive index in the range 1.69 to 1.75 when deposited at temperatures below about 30°C. These refractive indices can be raised by application of the esters at higher temperatures, or by heating the film or multilayer sandwich after deposition. The ester may be applied in the absence of a solvent, but is preferably applied in solution in a suitable inert volatile solvent, for example a volatile hydrocarbon, e.g. petroleum spirit, ether, or alcohol. When such a solvent is used, it is most important that it should be removed from the layer before the titanic or zirconic ester or alkaline earth metal titanic ester is hydrolysed. If any significant hydrolysis of the ester takes place before the solvent has been entirely removed, the titanium or zirconium dioxide or alkaline earth metal titanate separates as small, rounded particles which dry to give a chalky, non-pearly powder rather than a clear, adherent film. For dipping techniques 40°–60°C. petroleum ether is a suitable solvent but for roller-coating techniques, as hereinafter described, a higher boiling solvent may be desirable. Ordinarily, the titanic or zirconic esters or alkaline earth metal titanic esters are hydrolysed by contact with moist air, as lower alkyl titanates, zirconates and alkaline earth metal titanic esters are rapidly hydrolysed at ambient temperatures under these conditions. The rate of hydrolysis is determined, inter alia, by the relative humidity of the moist air and the ambient temperature. Satisfactory results can in general be obtained at 20–50 percent relative humidities at temperatures in the range of 20°–36°C. At temperatures in the range 20°–30°C., using 4–8 percent by weight solutions of titanic esters in petroleum ether (b.p. 40°–60°C.) at speeds of dipping of 2 to 4 cm. per second, using a 0.01 inch (0.25 mm.) thick polyethylene terephthalate belt coated with a 100 μ thick layer of polyethylene glycol (M.W. = 20,000), a 30 percent relative humidity will generally give a satisfactorily rapid hydrolysis time without any danger that the hydrolysed film will not be clear and adherent. Where difficulty is encountered in the formation of a clear film, it is nearly always correct to assume that lower humidity conditions would give better results. The lower the concentration of the titanic ester solution, the more difficult it is to produce a clear transparent film. The lowest concentration of solution at which it is possible to obtain clear films of titanium esters by dipping followed by evaporation of the solvent, even with humidities as low as 2 percent, is about 0.2 percent by weight. Extrapolation of the measured film thicknesses obtained with more concentrated solutions to these low concentrations suggests that monolayer films would be produced at solution concentrations of 0.1 to 0.05 percent by weight. This is therefore the minimum possible concentration.

After the high refractive index layer has been formed, an interleaving layer is applied. As already stated, this is formed either of an oxide or hydroxide (preferably of aluminium, silicon, magnesium/aluminium, calcium/aluminium, strontium/aluminium, sodium/tin, magnesium, calcium, aluminium/titanium, or lithium/titanium), or a mixture of such oxides or hydroxides, or of an organic film-forming substance containing hydroxyl or other reactive groups. The former class of substance is applied in a manner very similar to that used for the high refractive index layer, i.e. by applying a thin layer of a suitable hydrolysable compound, e.g. an alkoxy derivative or a mixture of alkoxy derivatives in which each alkoxy group contains one to eight carbon atoms, and then hydrolysing the said layer to produce a thin clear layer of the corresponding oxide or hydroxide. Because these oxides and hydroxides have much lower refractive indices than those of titanium dioxide, zirconium dioxide or alkaline earth metal titanates, usually in the range 1.45 to 1.57, the interleaving layers contribute to the desirable pearlescent properties of the resulting product, through mutlilayer interference effects. Some of these interleaving layers, including aluminium oxide, tend to stabilise the titanium dioxide against its previously mentioned tendency to discolour. A pigment prepared on a polyethylene glycol release layer with titanium dioxide high refractive index layers an aluminium oxide interleaving layers is stable on storage in light. Moreover, pigments made with inorganic oxide interlayers have the advantage of being (when dehydrated) thermally stable so that the final pigment can be made thermally stable. If desired, these hydrolysable compounds may be applied in admixture with up to 10 percent by weight of a hydrolysable titanic or zirconic ester or alkaline earth metal titanic ester to improve adhesion of the interleaving layer to the titanium or zirconium dioxide or alkaline earth metal titanate layers. A greater proportion than this, however, impairs the optical properties of the final product. For example, the addition of 10 percent by weight of a titanium ester to a solution of aluminium isopropoxide in petroleum spirit, produces a negligible increase in the refractive index of the interleaving layer produced. A greater proportion of titanium ester, however, raises the refractive index of the interleaving layer to an extent which impairs the reflectivity of the final product. In the case of lithium alkoxides, however, the starting materials are of very low solubility in suitable volatile solvents. This problem of solubility can be overcome by making a more readily soluble mixed ester in which titanium is the second metal. The titanium ester content is then somewhat higher (33 percent molar) than th 10 percent by weight specified above but the refractive index of the resulting interleaving layer is within satisfactory limits. It is only with alkoxides such as lithium alkoxides, which by themselves would yield interleaving layers of very low refractive index that the addition of quantities of titanium ester up to 33 percent molar produces interleaving layers of satisfactory refractive index.

It is to be noted that mixed alkoxides or esters of different elements are not generally simple mixtures of alkoxides or esters, but are compounds, as is illustrated by their physical properties. Thus calcium isopropoxide is poorly soluble in non-polar solvents and is involatile, while calcium aluminium isopropoxide is very soluble in petrol and can be distilled unchanged.

The preferred materials, because they are stable and readily soluble in petroleum spirit to give clear, colourless solutions are calcium aluminium isopropoxide, magnesium aluminium isopropoxide, aluminium isopropoxide and aluminium isopropoxide/sec-butoxide. Of these the last is especially preferred because it is commercially available in liquid form which promotes ease of handling.

Alternatively, the interleaving layer is of an organic film-forming substance containing hydroxy or other reactive groups, for example a soluble cellulose derivative such as cellulose diacetate, a partially hydrolysed polyvinyl acetate, a polyvinyl acetal or butyral, gelatin, or an organo-silanol. The solvent used to dissolve such substances will, of course, depend on the precise material being used. For example, for cellulose diacetate, acetone is a suitable solvent. It is important that the organic film-forming substance should contain groups such as hydroxyl, carboxylic ester, or carboxylic anhydride groups, which react with residual alkoxy groups in the titanium or zirconium dioxide or alkaline earth metal titanate layer to ensure good chemical bonding between the latter and the interleaving layer. This prevents delamination of the nacreous pigment in use.

After the interleaving layer, a layer of titanium or zirconium dioxide or alkaline earth metal titanate is applied in the manner already described. In this way, a multi-layer laminate can be built up consisting of alternate high refractive index layers and interleaving agent layers. The number of high refractive index in the laminate will not ordinarily be less than 3 and is preferably 3–8. Above about 15 layers, no further advantage is obtained and the production of the pigment becomes unnecessarily complicated.

The thickness of the high refractive index layers and the interleaving agent layers is of some importance as it determines the precise optical properties of the pigment. In general, each layer will be 0.01–1 micron in thickness, and is preferably 0.03–0.3 micron in thickness. It is advantageous, if a very white product is desired, for each layer to be from 0.03–0.1 micron in thickness and vary in thickness within this range as this eliminates coloured effects caused by optical interference.

If, however, a material displaying colour due to optical interference is required, then the thickness and evenness of the layers must be controlled. Such control of the thickness of the interleaving layers is more readily obtained when the inorganic oxide or hydroxide interleaving agents (b) are used. If $n$ is the refractive index of a layer, and $d$ is the thickness, then the colour displayed by a thin layer is governed by the product $n \cdot d$ (the optical thickness).

The colours observed at normal incidence in reflection on such a film are determined partly be reinforcement (constructive interference) of light of wavelengths $(4/2N-1) \cdot nd$, but mainly be destructive interference of light of wavelengths $(2/n) \cdot nd$, where $N$ is a positive integer. The resulting variation of colour with increasing film thickness is given by Newton's scale of colours. For example a film 115 $\nu$ thick of titanium dioxide of refractive index 1.94 will have an optical thickness $115 \times 1.94 = 223$ $\mu$. and light of wavelength $2 \times 223$ $\mu$ $=446$ $\mu$ (blue) will be diminished in relfection, and the resulting reflection colour will be orange. For multilayer films the constructive interference becomes more important, and where each layer in a multilayer stack is of equivalent optical thickness, the reflected colour becomes more intense and saturated, and the variation of colour with angle of viewing becomes more striking. Thus by incorporation of the pigment of this invention, articles can be made which show a coloured pearly sheen the colour of which varies with the angle of observation. For materials displaying colour due to optical interference, the thickness of the high refractive index layers and the interleaving layers is preferably 0.05–0.3 micron.

When dipping techniques are used for the production of thin layer films, solutions of about 3–6 percent of metal ester in petroleum spirit generally give high refractive index and interleaving layers of the correct thickness to show first order interference colours, but the precise thickness depends on the conditions of dipping used. The colour shown by a layer deposited from a solution of given concentration cannot be exactly defined, because the film thickness is dependent only on measurable quantities such as belt speed, but also on such features as the surface perfection of the release layer, and the draught drying the solution on the belt. For a given machine, even belt speed, even ventilation, vertical withdrawal of the belt and protection of the metal ester solution from vibration which would disturb the surface, are important to ensure uniform films of the same thickness both sides of the belt.

In general, an increase of 10 – 20 percent in the concentration of the metal ester, keeping all other conditions constant in a given dipping arrangement, results in a colour change of one spectral colour in the order of increasing wavelength. In practice violet, blue and green are easier to obtain from first order interference under these conditions, because the slight irregularity causing colour variation and the colour variation with angle of viewing are such as to favour cancellation of the reds and yellows. By the use of higher orders of interference (thicker layers), however, it is easy to obtain more saturated reds and yellows.

After the requisite number of layers has been built up on the support, the pigment is removed therefrom in an appropriate manner, for example by immersing the support in water when a water-soluble release agent, such as a polyethylene glycol release layer, is used. The pigment separates from the support either as a soft film material or as rather coarse particles which can be separated from the water in conventional manner, e.g. by decantation, filtration or centrifugation. The material may then be immersed in a bath of acetone or ethanol to dehydrate it and finally comminuted without crushing to small particle size, e.g. by vigorous stirring in viscous solution, by ultrasonic agitation, or by passage through a colloid mill. It is most important not to crush the product as this destroys its desirable optical properties. Ordinarily, each particle of the comminuted pigment is 1–70 microns across and preferably 5–50 microns across.

The particular conditions for comminution required depend on the strength of the particles which is dependent, inter alia, on the particular interleaving layer used and upon the conditions of deposition. In general satisfactory comminution can be accomplished by two passages in dibutyl-phthalate through a colloid mill with a rotor speed of 10,000 revs/min. using a gap setting of 0.0015–0.0002 inch (0.038–0.051 mm).

If material having a sparkling decorative appearance is required as opposed to material for strictly nacreous finishes, then larger particle sizes perhaps up to 1–2 mm. diameter are required and comminuting conditions adjusted accordingly, or the comminution omitted.

It is possible to increase the amount of pigment produced for a given area of support by forming a multilayer laminate in the manner already described, and then coating the upper surface of this laminate with a further layer of release agent and then building up a further multi-layer laminate in the same manner. In this way, two or more layers of the pigment can be built up on a single area of support.

When the interleaving agent is one of the aforesaid inorganic oxides or hydroxides or mixtures of inorganic oxides or hydroxides, the nacreous pigment product may be dehydrated by heating. Good results may generally be obtained by heating to about 450°C., but higher temperatures may be used if desired. This gives a wholly inorganic product which has good heat resistance. If it is desired to heat the pigment in situ on the support, this may be achieved by using a suitable heat-resistant support, e.g. of stainless steel. The heating also serves to raise the refractive index of titanium and zirconium dioxide and alkaline earth metal titanate layers.

The new process readily lends itself to continuous operation. Thus, a continuous belt may be fed first into a solution of a titanic or zirconic ester or alkaline earth metal titanic ester, then through a zone in which the solvent is evaporated and the ester hydrolysed to give a clear layer of titanium or zirconium dioxide or alkaline earth metal titanate, and finally into a solution of the interleaving agent, before being repassed into the solution containing the titanic or zirconic ester or alkaline earth titanic ester. After a sufficient number of layers have been built upon the belt, the pigment may be stripped from the belt, e.g. by immersion in water when a water-soluble release agent is used, and then worked up in the manner already indicated. Alternatively, a very long belt of a flexible support may be passed successively through alternate baths of titanic or zirconic ester or alkaline earth metal titanic ester solution an interleaving agent solution, the evaporation of the solvents and the hydrolysis of the ester taking place between the various baths. Finally, the belt is passed into an aqueous bath which detaches the pigment from the support and the belt is then wound up (after suitable cleaning) for reuse. In this latter method, the number of high refractive index layers in the resulting pigment is clearly determined by the number of baths through which the belt is passed.

There are many techniques in the coating industry for producing thin layers of a material by some form of roller coating; but none of these processes are routinely used to coat layers as thin as those used in this invention. By experimentation it has been found that very even layers of the thicknesses required can be deposited by a commercially available roller coating machine, when a reverse roller kiss coating method is used. These machines can operate with belt speeds up to 1,000 feet per minute or more, and thus can give a much faster rate of production than a simple dipping procedure. By arranging several coating stations in series, all the layers can be coated in sequence in one operation. Moreover, by using a continuous belt and a washing stage in the process, continuous operation is possible.

The invention is illustrated by the accompanying drawings, in which:

FIG. 1 is a cross-section, greatly enlarged, of a pigment particle in accordance with the invention; and FIG. II shows diagrammatically an apparatus for producing a pigment in accordance with the invention.

In FIG. I, a pigment particle comprises three thin, clear films 1 of high refractive index material, e.g. titanium dioxide, separated by two thin, clear, adherent layers 2 of an interleaving agent, e.g. aluminium oxide.

In FIG. II, a long belt 11 of polyethylene terephthalate film is unwound from spool 12 and passes over idler rollers 13 to drive roller 14, and is then wound up on take-up spool 15. Successive layers of release agent high refractive index material and interleaving agent are applied to the belt 11 by the coating roller 16, which rotates in the direction shown, i.e. in the opposite direction to the belt 11. The amount of coating solution 19 applied to the belt 11 is controlled by the gap 18 between the doctor roller 17 (which rotates in the direction shown) and the coating roller 16. The surface of the doctor roller is itself scraped free of solution 19 by the doctor blade 20. The whole coating operation takes place within box 21 which provides a controlled atmosphere. After being coated, the belt 11 passes through drying oven 33 in which, after the solvent of solution 19 has evaporated, the deposited layer is hydrolysed by atmospheric water vapour entering through inlet 23. The air is mainly exhausted at outlet 24, but some hot air leaves via outlet 25 to provide a controlled atmosphere in box 21. After leaving oven 22, the belt passes over drive roller 14 and is wound up on take-up spool 15. The operation is repeated for each layer applied to the support, and after a sufficient number of layers have been applied, the pigment is stripped from the support and further treated in the manner already described.

The following examples illustrate the invention.

EXAMPLE 1

An endless belt of polyethylene terephthalate (0.01 inch [0.254 mm.] thick) is passed three times through a 4% w/v solution of polyethylene glycol 6,000 in methanol, the belt being dried between coatings. This gives a film about 100 microns thick of the polyethylene glycol. The belt is then passed at a speed of 1.2 cm. per second through a 4% w/v solution of redistilled tetraisopropyl-titanate in petroleum spirit (b.p. 40°–60°C.). The petroleum spirit evaporates and the tetra-isopropyl-titanate then hydrolyses by contact with atmospheric moisture to produce a clear layer of titanium dioxide. The humidity of the air surrounding the belt is 25–30 percent at a temperature of 28°C. The belt is then passed through an 0.6% w/v solution of cellulose diacetate in acetone, and the acetone is allowed to evaporate. The belt is passed again through the titanate solution and the cellulose diacetate solution in succession until 10 layers of titanium dioxide and nine interleaving layers of cellulose diacetate have been formed. The belt is then immersed in water to wash off the products (or alternatively another coating of the polyethylene glycol is deposited on the product and the sequence of operations repeated to provide a larger amount of material on the single support). The product washed off by the water is collected, washed well with acetone and then comminuted by ultra-sonic agitation in acetone. It has a brilliant sivery-white lustre when dispersed in acetone or similar solvent. When the pigment is dried or is a dry laquer film it is somewhat less lustrous with a bluish tinge. Typical particle size after comminution is 20–31 × 20–40 $\mu$ the material containing no particles greater than 70 × 70 $\mu$.

The product so obtained, while of relatively low heat stability because of its cellulose diacetate content, is very suitable for use in applications where a non-toxic pearlescent pigment is required and stability to heat is not important, for example in cosmetics such as eye shadows, lipsticks and nail varnishes, or in leather finishes an printing inks.

EXAMPLE 2

This procedure is conducted at an air humidity of 40 percent at 32°C. An endless belt coated with a layer of polyethylene glycol 6,000, is coated with a clear layer of titanium dioxide, as in Example 1. The belt is then passed into a solution of 3% w/v aluminium isopropoxide and 0.3% w/v tetra-isopropyl titanate in 40°–60°C. petroleum spirit. The solvent evaporates and the esters hydrolyse to a clear layer of aluminium oxide containing titanium dioxide. The belt is passed alternately through the tetra-isopropyl titanate solution and aluminium isopropoxide/tetra-isopropyl titanate solution until five layers of titanium dioxide and four interleaving layers have been formed. The belt is immersed in water to remove the product, which is collected by centrifuging, transferred into acetone and reduced in size by ultra-sonic agitation. The product is basically white and highly lustrous showing a strong nacreous effect. Typical particle size after comminution in 6–41 × 4–21 $\mu$. The product so obtained is stable in plasticizers such as dibutyl phthalate and in plastics such as PVC to 180°C. without loss of lustre, and is suitable for uses where moderate heat stability is required, such as the preparation of soft (plasticized) calendered PVC sheeting.

EXAMPLE 3

A stainless steel plate is coated by dipping in a 5% v/w solution of polyethylene glycol 6,000 in methanol. The plate is then dipped alternately into a 4% w/v solution of redistilled tetra-isopropyl titanate in 40°–60°C. petroluem spirit, and a 4% w/v solution of aluminium isopropoxide in 40°–60°C. petroleum spirit. The latter solution is prepared from the transparent resinous material (monomeric aluminium isopropoxide) which is produced by melting commercial solid aluminium isopropoxide by heating to 120°–130°C. and then allowing it to cool. Between each dipping in ester solution, 20–30 seconds are allowed at an air humidity of 40 percent at 32°C., to ensure the hydrolysis of the esters. When three layers of titanium dioxide and two of aluminium oxide have been produced, the plate is heated at 450°C. for 1 hour. The product is removed from the plate by immersion in water and gentle brushing. The particles are filtered off, transferred into ethanol and comminuted by ultrasonic agitation. The product is silvery-white before heating, and very pale gold after heating. Typical particle size after comminution is 8–43× 6–27 $\mu$. The product so obtained, though slightly less lustrous than that prepared without calcining, is stable to 240°C. (or even higher temperatures) in dialphanyl phthalate without charring or loss of lustre, and is suitable for applications where heat stability is important, such as in hot pressed resins.

EXAMPLE 4

A solution is made up from 4% w/v tetra-ethyl silicate in dry ethanol, and to this is added 3% w/v concentrated hydrochloric acid to promote hydrolysis.

A glass plate is coated by dipping in a 0.7% w/v solution of cellulose acetate in acetone and allowed to dry. The plate is then dipped alternately into a 4% solution of redistilled tetra-isopropyl titanate in 40°–60°C. petroleum spirit, and the above-mentioned ethyl silicate solution. Between each dipping sufficient time is allowed for the solvent to evaporate and to ensure hydrolysis of the esters to clear film. For this purpose the humidity should be not more than 50 percent at a temperature of 23°C. When three layers of titanium dioxide and two of silica have been formed, the plate is immersed in acetone. The product is removed by gentle brushing, and the particles collected by centrifuging, transferred into ehtanol and reduced in size by ultasonic agitation. The product is basically white and lustrous showing a strong nacreous effect. Typical particle size after comminution is 6–37 × 6–29 $\mu$. The pearly suspension is similar to that obtained from aluminium ester as interleaving agent.

EXAMPLE 5

A glass plate is coated by dipping it into a 2 ½% w/v solution of polyethylene glycol 20,000 in methanol. The plate is then dipped alternately into a solution of 4% w/v tetra-isopropyl titanate in 40°–60°C. petroleum spirit and a solution of 3% w/v aluminium isopropoxide/aluminium sec-butoxide in 40°–60°C. petroleum spirit, until three layers of titanium dioxide and two interleaving layers have been formed. After dipping, each layers is dried in a current of air at 90°–100°C. for 10–20 seconds. The plate is immersed in water and the particles of product are collected by decantation, transferred to acetone and reduced in size by ulta-sonic agitation, until a suspension of pearling agent of the required degree of fineness is obtained. The product is basically white an highly lustrous showing a strong nacreous effect. Typical particle size after comminution is 7–14 × 22–35 $\mu$. The same basic procedure can be used for preparing useful products from a wide variety of substances for example:

a. A 4% w/v solution of tetra-2-ethylhexyl titanate is used in place of tetra-isopropyl titanate. The plate is heated for 4 hours at 40°C. after each titanate ester layer has been applied. This product is less lustrous than the product in Example 5. Typical particle size after comminution is 8–33 × 4–21 $\mu$.

b. A 4% w/v solution of mixed tetra(methyl/isopropyl)titanate in 40°–60°C. petroleum spirit - benzene is used in place of the tetra-isopropyl titanate. The mixed ester solution is made by heating 70 parts by weight of tetramethyl titanate with 30 parts of tetra-isopropyl titanate together at 200°C. until a clear liquid is obtained, and dissolving the cooled material in 40°–60°C. petroleum spirit containing 4% w/v of benzene to aid solubility. Hydrolysis is effected at 23°C. and 33% relative humidity. The product is similar in appearance to the product in Example 5. Typical particle size after comminution is 6–29 × 4–29 $\mu$.

c. A 3.5% w/v solution of tetra-n-butyl zirconate is used in place of tetra-isopropyl titanate. The product obtained is less lustrous than the product in Example 5. Typical particle size after comminution is 6–33 × 4–29 $\mu$.

d. A 4% w/v solution of tetra-n-propyl zirconate is used in place of tetra-isopropyl titanate. Hydroylsis is effected at 26°C. and 40% relative humidity. The product is whiter in colour than the product in Example 5, but less lustrous. Typical particle size after comminution is 10–25 × 8–25 $\mu$.

e. A 4% w/v dibutyl polytitanate solution is used in place of tetraisopropyl titanate. The product is less lustrous than the product in Example 5. Typical particle size after comminution is 10–33 × 8–27 $\mu$.

f. A monel metal sheet is used in place of the glass plate. (Hydrolysis is effected at 26°C. and 20% relative humidity). The product strips more readily from this support, the particles are larger, and show strong green and purple reflection colours. Typical particle size after comminution is 6–25 × 6–25 $\mu$.

g. A phosphor bronze sheet is used instead of a glass plate. (Hydrolysis is effected at 26°C. and 20% relative humidity). The performance of the support and the product, is similar to that in modification (f). Typical particle size after comminution is 10–29 × 8–29 $\mu$.

h. A 2% w/v polyvinyl pyrrolidone solution is used to form the release layer instead of the polyethylene glycol layer. The product obtained is very silvery in appearance. Typical particle size after comminution is 10–25 × 8–21 $\mu$.

i. A 2% w/v solution of polyvinyl methyl ether (Gantrez M 154 of Fine Dyestuffs and Chemicals Ltd.) in acetone is used to form the release layer instead of polyethylene glycol. (Hydrolysis is effected at 22°C. and 24% relative humidity). The material contains much more powdery material than the product in Example 5 and is correspondingly less lustrous. Typical particle size after comminution is 8–25 × 6–21 $\mu$.

j. A 3% w/v solution of tetra-ethyl titanate is used in place of the tetra-isopropyl titanate. (Hydrolysis is effected at 25°C. and 24% relative humidity). The product is more lustrous than the product in Example 5. Typical particle size after the comminution is 8–33 × 8–16 $\mu$.

k. An 8% w/v solution of tetra-isopropyl titanate and 7% w/v solution of aluminium isopropoxide/sec-butoxide is used. The thicker platelets settle more quickly than those in Example 5 and its modifications (a) to (j), but can be satisfactorily incorporated into plastic moulded sheets. Typical particle size after comminution is 8–25 × 8–18$\mu$.

l. Diethyl ether is used to dissolve the tetra-isopropyl titanate instead of petroleum spirit. The product is similar to the product in Example 5.

EXAMPLE 6

A polyethylene terephthalate belt (0.01 in.[0.254 mm] thick,), 60 yds.(54.8m)long by 10 inches(25.4 cm)wide, is coated by passing it twice through a 3% solution of polyethylene glycol 25,000 in methanol. It is then passed at a speed of 2 cm/sec. through solutions of 4.7% w/v tetra-n-hexyl titanate in 40°–60°C. petroleum spirit and 4.7% w/v aluminium-n-hexoxide in 40°–60°C. petroleum spirit until three layers of titanium dioxide and two interleaving layers have been formed. The product is stripped from the belt by immersion in water, collected by centrifuging and transferred, first to acetone, and then to dibutyl phthalate. The product is comminuted by passage through a colloid mill with a stainless steel rotor, rotating at 10,000 revs/min. set at a 0.002 in. [0.05 mm] gap. Typical particle size after comminution is 4–19 × 7–30 $\mu$. The resulting suspension is less lustrous than that of samples made from tetra-isopropyl titanate and aluminium isopropoxide, but offers advantages in procedure, in that clear films can be made under higher humidity conditions than are possible with the iopropoxy compounds.

EXAMPLE 7

A glass plate is coated with a release layer of polyethylene glycol as in Example 5, and dipped alternately in a solution of 4% w/v tetra-isopropyl titanate in 40° – 60°C. petroleum spirit and a solution of 0.5% w/v ethyl-hydroxyethyl-cellulose (low viscosity grade) in 40°–60°C. petroleum spirit containing enough isopropanol (10% v/v) to produce a clear solution. After dipping, each layer is dried in a current of air at 90°–100°C. for 10–20 seconds, the relative humidity of the ambient air being 42% at 22°C. After four layers of titanium dioxide and three layers of interleaving agent have been laid down, the plate is immersed in water with gentle agitation. Large particles of product are collected by decantation and transferred to acetone, or are caught on a wire gauze, and immersed in acetone, and reduced in size by ultra-sonic agitation. The rather powdery product is less lustrous than the product in Example 5. Typical particle size after comminution is 8–43 × 6–37 $\mu$.

In principle any suitable organic film-forming substance may be used in the procedure of this Example in place of the ethyl-hydroxyethyl cellulose. For example:

a. An 0.6% w/v solution of polyvinyl acetal (Alvar 1570 of Shawinigan Ltd.) in acetone is used. The product is only slightly inferior to the product in Example 5. Typical particle size after comminution is 10–25 × 4–10 $\mu$.

b. An 0.5% w/v solution of polyvinyl butyral (S-LEC resin type BH-2 of British Traders and Shippers) in acetone is used. The lustrous product is similar to the product in Example 5. Typical particle size for this product after comminution is 10–39 × 8–21 $\mu$.

c. An 0.6% w/v solution of partially hydrolysed polyvinyl acetate (ca. 40% hydrolysis; Resin D 383 of Shawinigan Ltd.) in actone is used. The product obtained is less lustrous than the product in Example 5. Typical particle size of this product after comminution is 8–25 × 8–21 $\mu$.

d. An 0.25% w/v solution of nitrocellulose (commercial pyroxylin, 10.5 – 12 percent nitrogen) in acetone is used. The product possesses a superior lustre but discolours rapidly on exposure to light.

e. An 0.5% w/v solution of a commercial sulphonamide-formaldehyde resin (Santolite MHP of Monsanto Ltd.) in acetone is used. The product obtained was of a silvery-white appearance with a satisfactory lustre. Typical particle size after comminution is 6–25 × 6–18 $\mu$.

f. A 3% w/v solution of a silicone glycol copolymer (Silicone Surfactant 193 of Dow Corning Ltd.) in acetone is used. The product is less lustrous than the product in Example 5. Typical particle size after comminution is 8–37 × 6–31 $\mu$.

g. An 0.5% w/v methyl vinyl ether-maleic anhydride copolymer (Gantrez AN 169 of Fine Dyestuffs and Chemicals Ltd.) solution in acetone is used. (Hydrolysis is effected at 23°C. and 25% relative humidity). The product obtained is particularly lustrous. Typical particle size after comminution is 8–25 × 6–21 $\mu$.

h. An 0.5% w/v methyl vinyl ether-ethyl hydrogen maleate copolymer (Gantrez ES 225 of Fine Dyestuffs and Chemicals Ltd.) solution in acetone is used. (Hydrolysis is effected at 23°C. and 25% relative humidity). The product obtained is substantially identical to that from the previous Example 7 (g). Typical particle size after comminution is 6–21 × 6–16 $\mu$.

i. An 0.5% w/v solution in acetone of p-t-butylphenol/formaldehyde novolak resin (prepared as described in Plastics Monograph C3-Phenolic Resins, page 86, published by the Plastics Institute), is used. The resulting product is pearly but dark yellow in colour. Typical particle size after comminution is 10–35 × 6–27 $\mu$.

j. An 0.5% w/v solution in acetone of a phenol/formaldehyde novolak resin prepared as described in Plastics Monograph C3-Phenolic Resins, page 86, published by the Plastics Institute) is used. The product obtained is similar to that from 7 (i) but paler yellow in colour. Typical particle size after comminution is 8–29 × 6–21 $\mu$.

k. An 0.5% w/v solution in acetone of ethyl cellulose of viscosity 7 c.p.s. and 48–49% ethoxy content, is used. A white product of good lustre is obtained. Typical particle size after comminution is 10–39 × 8–33 $\mu$.

EXAMPLE 8

A glass plate is coated by dipping it into a solution of 2.5% w/v polyethylene glycol 25,000 in methanol. The plate is then dipped alternately into a solution of 4% w/v tetra-isopropyl titanate in 40°–60°C. petroleum spirit and a 4% w/v solution of magnesium aluminium isopropoxide, $MgAl_2$ (i-O $C_3H_7$)$_8$ in 40°–60°C. petroleum spirit until three layers of titanium dioxide and two interleaving layers have been applied. After dipping, each layer is dried in a current of air at 90°–100°C. for 10–20 seconds, the ambient air being at 25°C. and 35% relative humidity. The glass plate is immersed in water to release the pigment layer, the particles of which are collected by centrifuging, transferred to ethanol and comminuted by ultrasonic agitation. Typical particle size after comminution is 10–25 × 10–25 $\mu$. The product is similar to that of Example 5.

Other inorganic substances can be used instead of the magnesium/aluminium ester used in this example, as interleaving agents, in the same concentration, except where indicated. For example:

a. A solution of calcium/aluminium isopropoxide, Ca $Al_2$(i-O $C_3H_7$)$_8$, is used. (Hydrolysis is effected at 25°C. and 50% relative humidity). The material produced is particularly lustrous, processing a soft sheen, giving the material a desirable appearance. Typical particle size after comminution is 4–29 × 4–21 $\mu$.

b. A solutio of strontium/aluminium isopropoxide $SrAl_2$(i-O $C_3H_7$)$_8$ is used. (Hydrolysis is effected at 32°C. and 44% relative humidity). The product is similar in appearance to the product in Example 5. Typical particle size after comminution is 8–33 × 8–21 $\mu$.

c. A solution of barium/aluminium isopropoxide, $BaAl_2$(i-O $C_3H_7$)$_8$, is used. (Hydrolysis is effected at 22°C. and 28% relative humidity). The product is optically satisfactory, being similar in appearance to the product in Example 5, but as compounds of barium are generally toxic, it cannot be used for cosmetic purposes. Typical particle size after comminution is 10–33 × 8–21 $\mu$.

d. A solution of calcium isopropoxide is used. (Hydrolysis is effected at 27°C. and 41% relative humidity). Because the calcium isopropoxide solution tends to polymerise on standing, making the solution cloudy, it is more difficult to produce clear films with this substance. Consequently, the product is less lustrous than the product in Example 5. Typical particle size after comminution is 6–25 × 6–21 $\mu$.

e. A solution of calcium/aluminium isopropoxide, CaAl (i-O$C_3H_7$)$_5$ is used. (Hydrolysis is effected at 23°C. and 30% relative humidity). The product is satisfactory but not as lustrous as that from 1:2 calcium-/aluminium isopropoxide in Example 8 (a). Typical particle size after comminution is 8–27 × 4–18 $\mu$.

f. A 3% w/v solution of sodium/tin ethoxide, $NaSn_2$ (OC$_2$H$_5$)$_9$ is used. (Hydrolysis is effected at 30°C. and 33% relative humidity). The product is less lustrous than the product in Example 5. Typical particle size after comminution is 6–29 × 6–21 $\mu$.

g. A 3.5% w/v solution of lithium/titanium isopropoxide $Li_2Ti$(i-O$C_3H_7$)$_6$ is used. (Hydrolysis is effected at 24°C. and 44% relative humidity). The product is similar in appearance to that of Example 8. Typical particle size after comminution is 6–25 × 6–16 $\mu$.

h. A 3% w/v solution of calcium/titanium isopropoxide CaTi (i-O$C_3H_7$)$_6$ is used as the high refractive index layer and a 4% w/v solution of aluminium isopropoxide is used as interleaving layer in the procedure described in Example 8.

(Hydrolysis is effected at 26°C, and 45% relative humidity). The product is similar in appearance to that of Example 8 (a). Typical particle size after comminution is 12–37 × 8–25 $\mu$.

EXAMPLE 9

A glass plate is coated by dipping it into 0.5% w/v cellulose diacetate (54–56% acetyl content as acetic acid on dried material) solution in acetone. The plate is dipped alternately into a 4% w/v tetra-isopropyl titanate solution in 40°–60°C. petroleum spirit and a 3.5% w/v solution of solvated magnesium methoxide (Mg(OCH$_3$)$_2$·3CH$_3$OH) in 4:1 methanol/benzene, until two layers of titanium dioxide and one interleaving layer is formed. After dipping, each layer is dried in a current of air at 90°–100°C. for 10–20 seconds, the ambient air having a relative humidity of 43% at 26°C. The plate is then immersed in acetone, and the particles of product collected by centrifuging, transferred to ethanol and comminuted by ultrasonic agitation. The product is similar in appearance to that of Example 8. Typical particle size after comminution is (6–14 × 4–10 $\mu$.

EXAMPLE 10

The process is carried out exactly as in Example 5, except that the concentration of titanium ester is 8% w/v and that of the aluminium ester is 0.5% w.v. The dipping is carried out at a relative humidity of 8% at a temperature of 36°C., and each layer is dried, after dipping, in a current of air at 90°–100°C. for 10–20 seconds. The product is less lustrous than the product in Example 5. Typical particle size after comminution is 6–25 × 4–25 $\mu$.

Similarly, other low concentrations of titanium and aluminium esters can be deposited in atmosphere having a similarly low moisture content. For example:

a. An 0.5% w/v solution of titanium ester and a 3% w/v solution of aluminium ester is used, the temperature being 34°C. and the relative humidity 8%. The product is less relfective and less lustrous than the product in Example 5. Typical particle size after comminution is 6–35 × 6–29 $\mu$.

b. A solution of 0.5% w.v titanium ester and an 0.5% w/v solution of aluminium ester is used, the temperature being 32°C. and the relative humidity 10%. Seven layers of titanium dioxide and six interleaving layers of aluminium oxide are applied. The product is rather transparent in appearance and contains powdery material which reduces the lustre. Typical particle size after comminution is 12–27 × 8–23 $\mu$.

c. A 3% w/v solution of titanium ester and an 0.2% w/v solution of aluminium ester is used, the temperature being 34°C. and the relative humidity 5%. The product is transparent in appearance and contains powdered material which reduces the lustre. Typical particle size after comminution is 8–29 × 8–23 $\mu$.

EXAMPLE 11

This is an Example of a calcined product. The aqueous suspension of product from Example 5 is suspended in a hot saturated solution of sodium sulphate in water. The suspension is cooled with continual stirring and the crystalline mass filtered off, and calcined by heating it at 450°C. for 20 mins. The cooled powder is immersed in water to dissolve the sodium sulphate, the resulting suspension is centrifuged, and the product transferred to acetone. A trace of dibutyl phthalate was added to the suspension and the material dried. Typical particle size is 12–30 × 12–38 $\mu$., with some powdery material. The resulting powder could be redispersed, and was incorporated into a P.V.C. sheet, giving it a pronounced pearly appearance.

EXAMPLE 12

It is important in this and the following Examples, which describe the production of material showing a net coloured effect (interference colours), to control the dipping conditions. This can be achieved by using an apparatus of the kind shown in FIG. II, ensiring tha the belt moves at constant speed, withdrawing the belt vertically from the solutions, and keeping the baths and immediate surroundings free from vibration and draughts.

An endless belt of polyethylene terephthalate is coated with a layer of polyethylene glycol 20,000 as in previous Examples. The belt is then passed at a speed of 2 cm./sec. through a 14% w/v solution of tetra-isopropyl titanate in 40°–60°C. petroleum spirit, and the solvent allowed to evaporate. The belt is then passed into a solution of 11% w/v aluminium isopropoxide/sec.-butoxide and 1% w/v tetra-isopropyl titanate in 40°–60°C. petroleum spirit. After four layers of titanium dioxide and three interleaving layers have been formed, the belt is immersed in water, and the product which is washed off is collected by centrifuging, washed with ethanol, and the particles reduced in size by ultra-sonic agitation. The resulting pearly suspension displays a coppery-red reflection colour and a blue-green transmission colour when viewed normally. At oblique angles of incidence the colour changes through greenish-yellow to green in reflection. These reflection colours may be more easily demonstrated by making the pearling agent up as a 10% w/v suspension in a nitro-cellulose lacquer and applying the lacquer to a matt black surface to form a film 0.01 inch (0.254 mm) thick. By microscopic examination in reflected light, 80–90% of the particles are found to display a fawn to orange-red reflection colour. The remainder are of other colours. The particles obtained directly from the belt are in the form of long thin plates of typical dimensions 50–200 $\mu$ × 5–20 $\mu$ × 1.5 $\mu$ thick. After comminuting, the particles are typically of dimensions 10 × 30 × 1.5 $\mu$.

EXAMPLE 13

This is carried out as in Example 12, using an 11% solution of tetra-isopropyl titanate, and a 9% w/v solution of aluminium isopropoxide/sec.-butoxide containing 1% w/v of tetra-isopropyl titanate, in place of the ester and ethoxide solutions used therein. The resulting particles have a strong blue-green to green reflection colour and a violet-purple transmission colour. Typical particle size comminution is 11–26 × 15–45 $\mu$.

EXAMPLE 14

This is carried out as in Example 12, but using a 4.5% w/v solution of tetra-isopropyl titanate, and a 3.25% w/v solution of aluminium isopropoxide/sec.butoxide in place of the ester and alkoxide solutions used therein. Three layers of titanium dioxide and two layers of aluminium oxide are laid down. The layers of titanium dioxide are approximately 60 m$\mu$ thick and those of aluminium oxide are approximately 75 m$\mu$ thick. Most of the particles after comminuting have dimensions of 10–20 × 20–40 × 0.33 $\mu$. The pearly suspension displays a blue reflection colour and an orange transmission colour.

In a similar manner, using a 4.5% w/v solution of tetra-isopropyl titanate and a 2.7% solution of aluminium akloxide, a purple-violet reflecting pearly product is obtained. The aluminium oxide layers in this case are about 65 $\mu$ thick.

Similarly, using a 4.5% w/v solution of tetra-isopropyl titanate and a 4.5% w/v solution of aluminium alkoxide in the procedure of the Example, a green-gold reflecting product is obtained, the aluminium oxide layers of which are approximately 105 m$\mu$ thick. The other dimensions are similar to the other products in this example. On examination in the reflecting microscope, about 80% of the particles are found to be of a green to gold colour. the remainder show other colours of the spectrum.

EXAMPLE 15

A commercially available pilot-coating machine is used in this Example to coat a 10 in. (25.4 cm.) wide, 500 feet (152.5 m) long belt of polyethylene terephthalate (0.005 in. [0.127 mm.] thick). The apparatus is as shown in FIG. II for reverse roller kiss coating, with the coating station completely enclosed in a clear plastics box 21. A proportion of the hot air in the drying oven 22 is directed into the enclosed box 21 to maintain the interior temperature of the latter at a predetermined level. The essential operating conditions are as follows:

| | |
|---|---|
| Belt speed | 50 feet per minute (15.25 m/min.) |
| Doctor roller speed | 14.5 feet per minute (4.42 m/min.) |
| Coating roller speed | 50 feet per minute (15.25 m/min) |
| Roller gap | 0.015 inch (0.038 mm) |
| Drying oven temperature | 50°C. |
| Coating solution temperature | 24°–31°C. |
| Relative humidity inside box 21 | ca 40% |
| Release layer solution | 3% w/v polyethylene glycol 20,000 in methanol |
| Titanium ester solution | 4% v/v tetra-isopropyl titanate in 40°–60°C. petroleum spirit |
| Aluminium ester solution | 8% v/v aluminium isopropoxide/sec-butoxide in approximately equal proportions in 40°–60°C. petroleum spirit |

The bell 11 is first coated with a release layer under the conditions described. The coating obtained is considerably more even in thickness than that obtained by dipping. Three layers of titanium dioxide are produced, interleaved alternately with two layers of aluminium oxide, by coating successively with the appropriate ester. The product is washed from the belt in the usual manner to give a lustrous pearly product with a pinking tinge. The coarse particles can be comminuted by colloid milling to the required size, and incorporated into a plastics material or a cosmetic formulation.

The refractive indices of the individual layers of the products of some of the preceding Examples have been measured and found to be as follows.

| Example | Refractive Index of High refractive index layer | Interleaving layer |
|---|---|---|
| 1 | 1.84–1.86 | 1.47–1.49 |
| 2 | 1.84–1.86 | 1.53–1.55 |
| 5 | 1.90–1.94 | 1.52–1.54 |
| 5a | 1.69–1.71 | 1.52–1.54 |
| 5b | 1.94–1.96 | 1.52–1.54 |
| 5d | 1.71–1.73 | 1.52–1.54 |
| 5e | 1.69–1.71 | 1.52–1.54 |
| 5j | 1.92–1.94 | 1.52–1.54 |
| 7d | 1.90–1.94 | 1.48–1.50 |
| 7k | 1.90–1.94 | 1.46–1.48 |
| 8 | 1.90–1.94 | 1.47–1.49 |
| 8a | 1.90–1.94 | 1.48–1.51 |
| 8b | 1.90–1.94 | 1.53–1.55 |
| 8c | 1.90–1.94 | 1.55–1.57 |
| 8d | 1.90–1.94 | 1.51–1.53 |
| 8e | 1.90–1.94 | 1.47–1.49 |
| 8f | 1.90–1.94 | 1.57–1.59 |
| 8g | 1.90–1.94 | 1.61–1.65 |
| 8h | 1.70–1.73 | 1.53–1.55 |
| 9 | 1.90–1.94 | 1.45–1.47 |
| 12 | 1.86–1.90 | 1.53–1.55 |

The value under equivalent conditions of the various substances available for preparing the high refractive index layers has been generally found under the conditions of the foregoing Examples to be in the order:- tetra-isopropyl titanate ≡ tetraethyl titanate ≡ tetra(methyl/isopropyl)titanate >tetra-n-propyl zirconate> , tetra-n-butyl zirconate, tetra-n-butyl titanate, calcium titanium isopropoxide> tetra-n-hexyl titanate, tetra(2-ethyl-n-hexyl) titanate > dibutyl polytitanate.

For the interleaving layers:- aluminium isopropoxide ≡ aluminium isopropoxide/sec-butoxide>aluminium hexoxide. The isopropoxide esters for the interleaving layer are graded in the order:- calcium/aluminium (1:2) >aluminium, strontium/aluminium, barium/aluminium, calcium/aluminium (1:1), magnesium (methoxide ester) silicon (tetra ethyl ester), magnesium/aluminium > calcium > lithium/titanium >> sodium/tin.

The organic film-forming substances used for interleaving layers are graded in order to whiteness of product thus: methyl vinylether/ethyl hydrogen maleate copolymer >methyl vinyl ether/maleic anhydride copolymer > sulphonamide/formaldehyde resin, ethyl cellulose, polyvinyl acetal>partially acetylated polyvinyl alcohol. For lustre, these materials are graded thus: methyl vinyl ether/ethyl hydrogen maleate or maleic anhydride > ethyl cellulose ≡ polytitanate. polyvinyl butyral>polyvinyl ≡ acetal>sulphonamide/formaldehyde resin> ethyl hydroxy ethyl cellulose. Nitrocellulose gives high lustre but poor colour.

The performance of the release layers tested is: polyvinyl pyrrolidone ≡ polyethylene glycol >> polyvinyl methyl ether.

The performance of the substrate materials tested is: glass>metals> polyethylene terephthalate>>> others.

We claim:

1. A pigment consisting of a plurality of particles, each comprising a plurality of clear layers, each of which is uniform and each of which is from 0.03 to 0.3 microns thick of titanium or zirconium dioxide, or an alkaline earth metal titanate, each such adjacent layer being separated by one and adhering to one or two, clear layers, each of which is uniform and each of which is from 0.03 to 0.3 microns thick, of an interleaving agent, which is an organic film-forming substance containing hydroxyl, carboxylic anhydride or carboxylic ester groups or a sulphonamide-formaldehyde resin, the refractive index of the layers of titanium or zirconium dioxide or alkaline earth metal titanate exceeding that of the layers of interleaving agent by at least 0.05, essentially all the particles being from 1 to 70 microns across.

2. A pigment according to claim 1 in which the interleaving agent is cellulose diacetate, ethyl-hydroxyethylcellulose, polyvinyl acetal, polyvinyl butyral, partially hydrolysed polyvinyl acetate, nitrocellulose, a sulphonamide-formaldehyde resin, a silicone-glycol copolymer, a methyl vinyl ether-maleic anhydride copolymer, a methyl vinyl ether-ethyl hydrogen maleate copolymer, a p-t-butyl-phenol-formaldehyde novolak resin, a phenol-formaldehyde novolak resin, or ethyl cellulose.

3. A pigment according to claim 1 in which the refractive index of the layers of titanium dioxide is 1.85 to 1.95 or of zirconium dioxide or alkaline earth metal titanate is 1.69 to 1.75 and the refractive index of the layers of interleaving agent is 1.45 to 1.50.

4. A pigement according to claim 1 comprising three to eight thin, clear layers of titanium or zirconium dioxide or an alkaline earth metal titanate.

5. A pigment according to claim 1 in which the thickness of the layers of titanium or zirconium dioxide or alkaline earth metal titanate and of the interleaving layers is 0.03 to 0.1 micron, the layers vary in thickness within the range and the pigment is white.

6. A pigment according to claim 1 in which the thickness of the layers of titanium or zirconium dioxide or alkaline earth metal titanate and of the interleaving layers is 0.05 to 0.3 microns, the layers are of controlled thickness within this range, and the pigment is coloured.

7. A pigment according to claim 1 in which each pigment particle is 5 to 50 microns across.

8. Process for the preparation of a pigment which comprises applying to a support a release layer and then alternately layers, each of which is uniform and each of which is from 0.03 to 0.3 microns thick, of (I) a hydrolysable titanic or zirconic ester or alkaline earth metal titanic ester and (II), as interleaving agent former, an organic film-forming substance containing hydroxyl, carboxylic anhydride or carboxylic ester groups or a sulphonamide-formaldehyde resin, hydrolysing each hydrolysable layer immediately after application to a clear layer by contact with water vapour such that after hydrolysis of each hydrolysable layer the refractive index of (I) exceeds that of layer (II) by at least 0.05; and when at least two layers of the titanic or zirconic ester or alkaline earth metal titanic ester have been applied and hydrolysed releasing the multilayer product from the support by dissolving away the release layer.

9. Process according to claim 8 in which the interleaving agent former used is cellulose diacetate, ethyl-hydroxyethyl-cellulose, polyvinyl acetel, polyvinyl butyral, partially hydrolysed polyvinyl acetate, nitrocellulose, a sulphonamide-formaldehyde resin, a silicone-glycol copolymer, a methyl vinyl ether-maleic anhydride copolymer, a methyl vinyl ether-ethyl hydrogen maleate copolymer a p-t-butyl-phenol-formaldehyde novolak resin, a phenol-formaldehyde novolak resin or ethyl-cellulose.

10. Process according to claim 8 in which the hydrolysable titanic or zirconic ester or alkaline earth metal titanic ester used is an alkyl titanate, zirconate, or alkaline earth metal titanate, in which each alkyl contains 1 to 8 carbon atoms.

11. Process according to claim 10 in which tetra-isopropyl titanate, tetra-n-butyl titanate, tetra-n-propyl zirconate, or calcium titanium isopropoxide is used.

12. Process according to claim 8 in which the support is of glass, polished metal, or polyethylene terephthalate film.

13. Process according to claim 8 in which the support is first provided with a water-soluble release layer.

14. Process according to claim 13 in which the release layer is polyethylene glycol of molecular weight 6,000 to 100,000, or polyvinyl pyrrolidone.

15. Process according to claim 8 in which the hydrolysable titanic or zirconic ester or alkaline earth metal titanic ester is applied as a solution in an inert volatile solvent, and the said solvent is evaporated before the said ester is hydrolysed.

16. Process according to claim 15 in which the said solvent is a volatile hydrocarbon.

17. Process according to claim 8 in which three to eight layers of hydrolysable titanic or zirconic ester or alkaline earth meal titanic ester are applied to the support and hydrolysed.

18. Process according to claim 8 in which, after removal from the support, the pigment is comminuted to a particle size of from 1 to 70 microns.

19. Process according to claim 18 in which, after removal from the support, the pigment is comminuted to a particle size of 5 to 50 microns.

20. Process according to claim 8 in which the layers are applied to the support by a reverse roller kiss-coating technique.

* * * * *